United States Patent [19]
Yasui

[11] Patent Number: 6,020,707
[45] Date of Patent: *Feb. 1, 2000

[54] SERVO-MOTOR DRIVING METHOD

[75] Inventor: Takaji Yasui, Nagano, Japan

[73] Assignee: Tamagawa Seiki Kabushiki Kaisha, Nagano-ken, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/174,443

[22] Filed: Oct. 19, 1998

[30] Foreign Application Priority Data

Oct. 28, 1997 [JP] Japan .................................. 9-295675

[51] Int. Cl.$^7$ .................................................. G05B 13/00
[52] U.S. Cl. ........................... 318/561; 318/569; 318/600; 318/615
[58] Field of Search ...................... 318/568–696

[56] References Cited

U.S. PATENT DOCUMENTS

| | | | |
|---|---|---|---|
| 3,634,746 | 1/1972 | Strege | 318/565 |
| 5,155,797 | 10/1992 | Nomura et al. | 388/815 |
| 5,489,829 | 2/1996 | Umida | 318/561 |

FOREIGN PATENT DOCUMENTS

| | | |
|---|---|---|
| 56-125992 | 2/1981 | Japan . |
| 1-298977 | 1/1989 | Japan . |

OTHER PUBLICATIONS

Conference Record, Publication Date: Mar. 10, 1993, "*Current Sensorless Field Oriented Control of Synchronous Relutance Motor*", Author(s): Takayoshi Matsuo and Thomas A. Lipo.

*Primary Examiner*—David Martin
*Attorney, Agent, or Firm*—Sughrue, Mion, Zinn, Macpeak & Seas, PLLC

[57] ABSTRACT

A conventional method for driving a servo-motor is carried out by means of a current feedback loop, using a current sensor and an A/D converter. In this conventional set-up, the number of parts was great, cost reduction was difficult and it was difficult to avoid control errors caused by errors in the precision of the current sensor.

A method for driving a servo-motor of the present invention comprises freely setting the current control response of a servo-motor (4) by changing the time-constant $\tau$ using a calculation system Ra+Las, which is opposite with respect to the calculation system of the servo-motor (4), and a primary delay element $1/1+\tau s$.

2 Claims, 4 Drawing Sheets

SERVO-MOTOR DRIVING METHOD

BACKGROUND OF THE INVENTION

1. Field of the Invention

The present invention relates to a method for driving a servo-motor, and more particularly to a new improvement for controlling current using a motor reverse-calculation system and a primary delay element, without requiring a current sensor and an A/D converter in a current feedback loop performing conventional motor current detection.

2. Description of the Related Art

FIG. 1 shows a conventional method of this type which has generally been used as a method for driving a servo-motor.

That is, a current command Icmd is input to a calculator 1. The output 1a of the calculator 1 is sent via a proportional and/or integral controller 2 and is input as a voltage command 2a to a power converter 3, comprising a known power element configuration. The power converter 3 supplies a three-phase drive current Iu, Iv, Iw to a servo-motor 4. A current sensor 5 detects one part of the three-phase drive current Iu, Iv, Iw, and the detected current value Ivcc is input to the calculator 1 via an A/D converter 6, thereby forming a current feedback control.

Since the conventional servo-motor driving method has the configuration described above, it has problems such as the following.

That is, a current sensor and an expensive A/D converter are required in order to form the current feedback system, constituting a considerable obstacle to lowering the cost of the control system.

SUMMARY OF THE INVENTION

The present invention has been realized after consideration of the above points and particularly aims to provide a method for driving a servo-motor wherein, by detecting power voltage without a conventional current feedback loop for motor current detection and controlling current using this detected value, control properties can be improved and cost lowered.

The method for driving a servo-motor which controls current of a servo-motor based on a current command comprises: freely setting a current control response of the servo-motor by changing a time-constant τ using a calculation system Ra+Las (where Ra is motor resistance, La is motor inductance and s is a Laplace operator), which is reverse with respect to a calculation system of the servo-motor, and a primary delay element 1/1+τs (where τ is the time-constant and s is the Laplace operator).

DESCRIPTION OF THE PREFERRED EMBODIMENT

Figure 1:
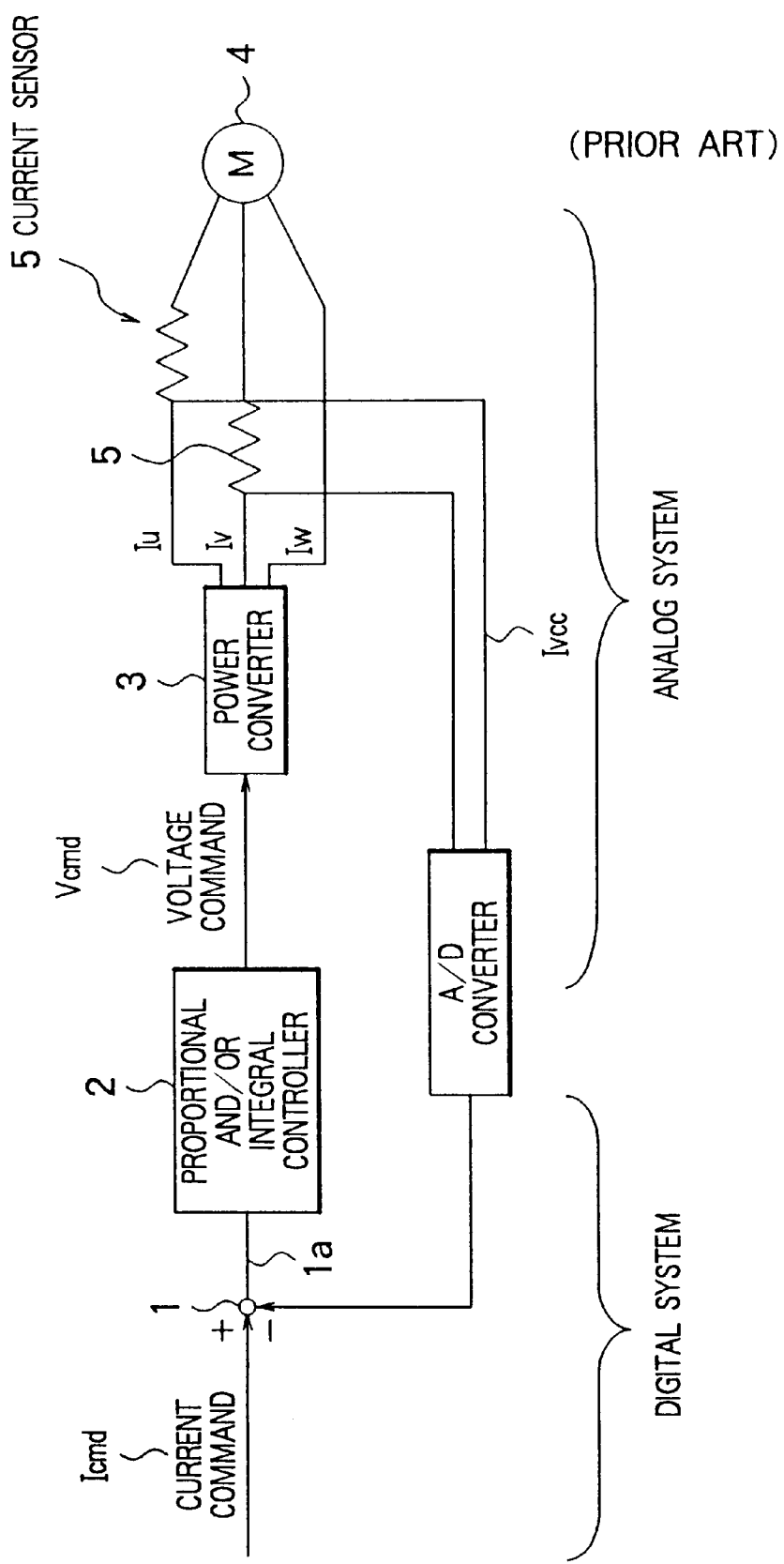
FIG. 1 is a block diagram showing a conventional control method.

There will be detailed below the preferred embodiment of the servo-motor driving method of the present invention with reference to the accompanying drawings. Like and similar members to the conventional example are explained using like reference characters.

Figure 2:
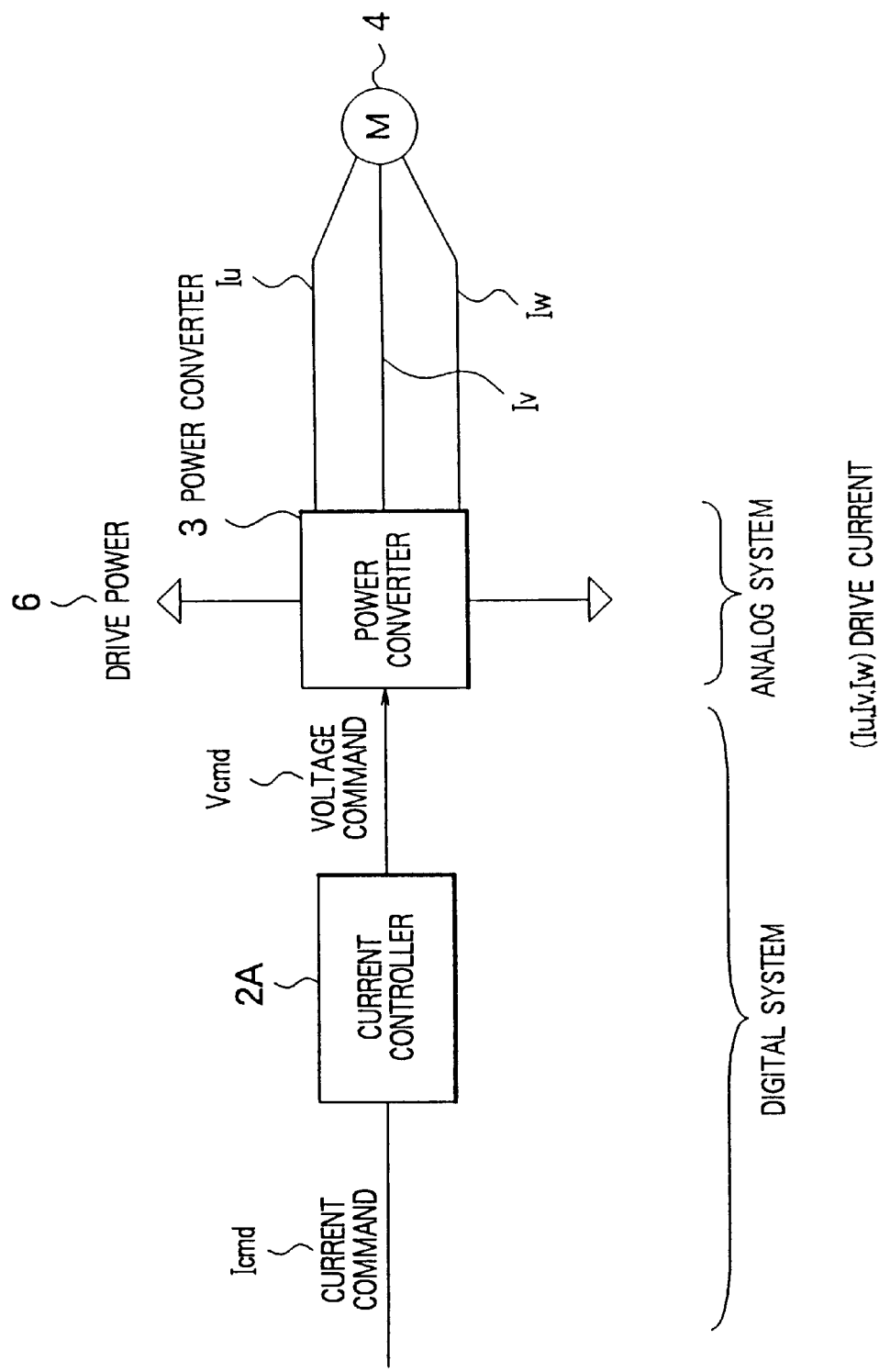
FIG. 2 is a block diagram showing a servo-motor driving method according to the present invention.

As shown in FIG. 2, current command Icmd, which comprises a current command value, is input to a current controller 2A and a voltage command Vcmd from the current controller 2A is applied to a known converter 3. A drive power source 6, for driving power elements not shown in the diagram, is connected to the power converter 3. The power converter 3 supplies a three-phase drive current Iu, Iv, Iw to a servo-motor 4.

Figure 3:
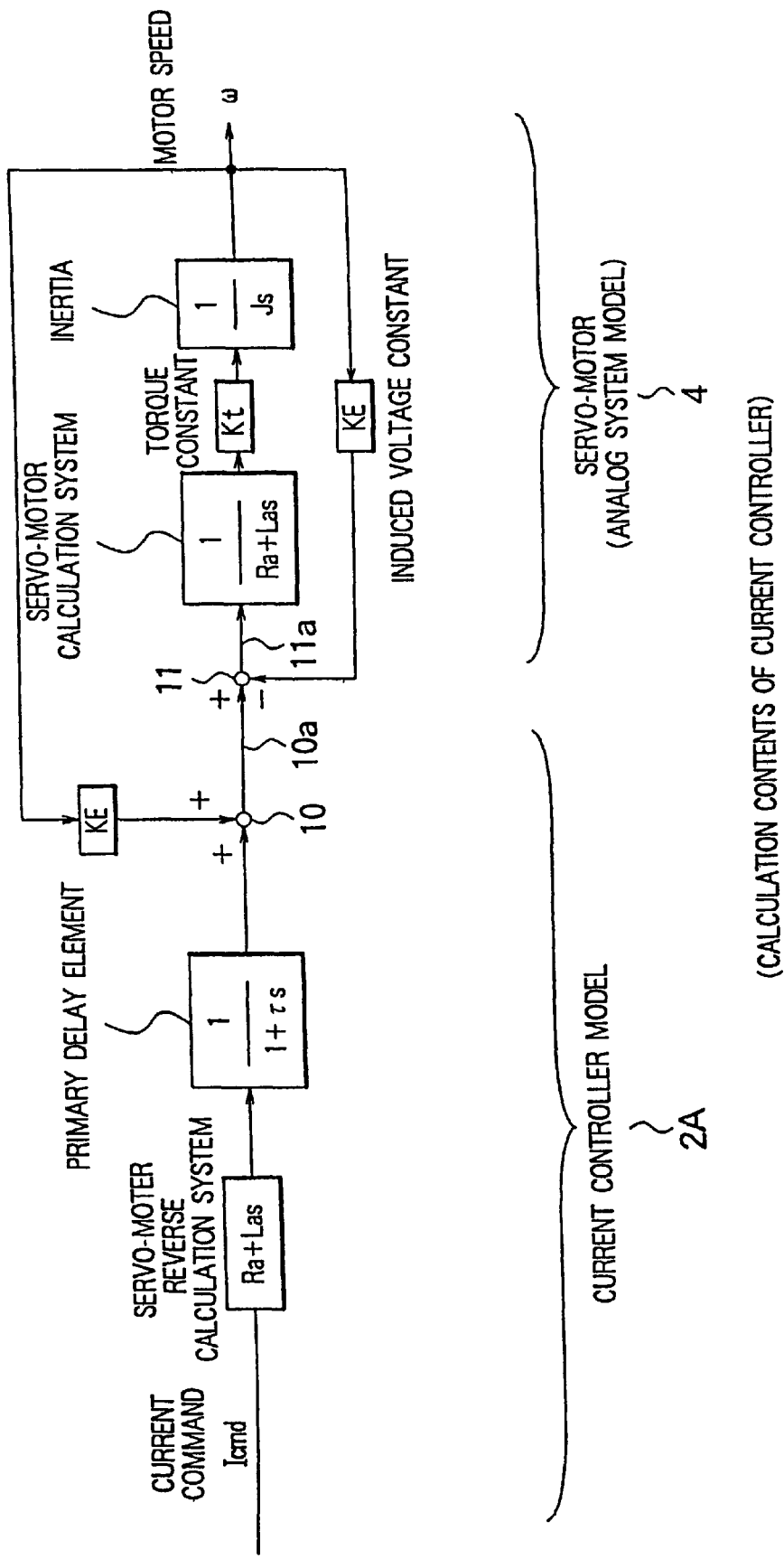
FIG. 3 is a control block diagram showing calculation contents of the current controller of FIG. 2.

Next, the calculation control of the current controller 2A will be explained more specifically. FIG. 3 shows the calculation contents of the servo-motor 4 and the current controller 2A as blocks. The current command Icmd is input to a first calculator 10 via a reverse calculation system (Ra+Las), which is reverse with respect to the calculation system (1/Ra+Las) of the servo-motor 4, and a primary delay element (1/1+τs, where τ is a time-constant and s is a Laplace operator). The output 10a from the first calculator 10 is input to a second calculator 11. The output 11a of the second calculator 11 passes via the calculation system (1/Ra+Las), a torque constant kt and an inertia 1/Js, whereby a motor speed ω is obtained. Here, the abovementioned Ra represents motor resistance, La represents motor inductance and s represents a Laplace operator. Each induced voltage constant KE obtained from the motor speed ω is input to the calculators 10 and 11.

Figure 4:
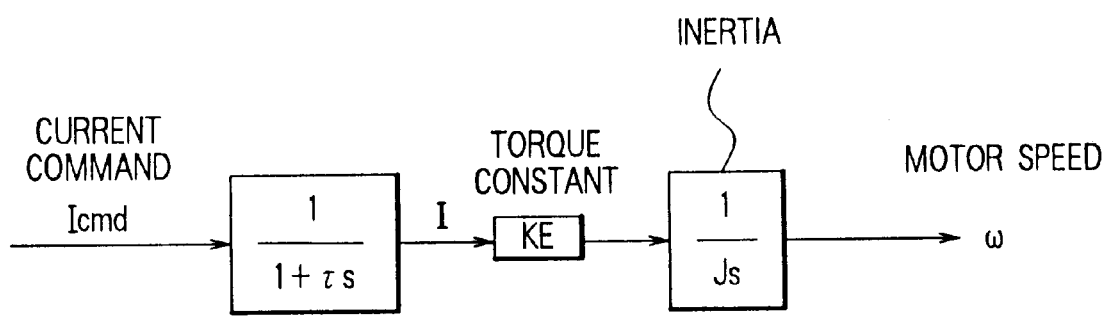
FIG. 4 is a control block diagram showing the normal control state of FIG. 3.

Next, when calculation control with the configuration shown in FIG. 3 is functioning normally, it reaches the calculation control state shown in FIG. 4, where the response of the current loop of the servo-motor 4 is equivalent to the primary delay element (1/1+τs) and the current control system accurately and freely follows the current target value as a result of changing the time-constant τ.

The servo-motor driving method of the present invention has the configuration described above and therefore obtains the following advantageous effects. That is, since the entire system can be controlled with a numeric calculation open loop, with no need for the current feedback system using a current sensor and an A/D converter which has conventionally been used, the consequent reduction of parts enables cost to be reduced and deterioration of control precision caused by current sensor noise can be prevented. Furthermore, since a primary delay element is used when controlling the current, the current control response of the servo-motor can be freely changed by changing the time-constant.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. A method of driving a servo-motor which controls a current of said servo-motor based on a command current, comprising:

inputting said command current;

acting on said command current and changing a time-constant $\tau$ using a calculation system based on Ra+Las, where Ra is motor resistance, La is motor inductance and s is a Laplace operator, and a primary delay element $1/(1+\tau s)$;

setting a current control response of said servo-motor based on said time-constant $\tau$;

where in the calculation system based on Ra+Las operates inversely on a value as compared to a calculation system of said servo-motor which is based on 1/(Ra+Las).

2. A method of driving a servo-motor as claimed in claim 1, wherein said primary delay element is used to set a response of a current loop of said servo-motor and said current of said servo-motor follows a current target value.

* * * * *